United States Patent
Okuyama et al.

(10) Patent No.: US 11,996,595 B2
(45) Date of Patent: *May 28, 2024

(54) POLYMER ELECTROLYTE MEMBRANE, MEMBRANE ELECTRODE ASSEMBLY AND POLYMER ELECTROLYTE FUEL CELL

(71) Applicant: AGC Inc., Tokyo (JP)

(72) Inventors: Takumi Okuyama, Tokyo (JP); Takeshi Hirai, Tokyo (JP)

(73) Assignee: AGC Inc., Tokyo (JP)

(*) Notice: Subject to any disclaimer, the term of this patent is extended or adjusted under 35 U.S.C. 154(b) by 178 days.

This patent is subject to a terminal disclaimer.

(21) Appl. No.: 17/407,231

(22) Filed: Aug. 20, 2021

(65) Prior Publication Data
US 2021/0391590 A1    Dec. 16, 2021

Related U.S. Application Data

(63) Continuation of application No. PCT/JP2020/008344, filed on Feb. 28, 2020.

(30) Foreign Application Priority Data

Feb. 28, 2019   (JP) .................. 2019-036477

(51) Int. Cl.
*H01M 8/1039*   (2016.01)
*C08F 216/14*   (2006.01)
(Continued)

(52) U.S. Cl.
CPC ..... *H01M 8/1039* (2013.01); *C08F 216/1475* (2020.02); *H01M 8/1004* (2013.01);
(Continued)

(58) Field of Classification Search
CPC ....... H01M 8/1039; H01M 2008/1095; H01M 8/1023; H01M 8/1004; C08F 2800/20; C08F 216/1475
See application file for complete search history.

(56) References Cited

U.S. PATENT DOCUMENTS

| 11,031,618 B2 * | 6/2021 | Saito .................. C08F 214/262 |
| 2011/0027688 A1 * | 2/2011 | Hommura ........... H01M 8/1039 521/38 |

(Continued)

FOREIGN PATENT DOCUMENTS

| EP | 2436705 A1 | 4/2012 |
| EP | 2460835 A1 | 6/2012 |

(Continued)

OTHER PUBLICATIONS

Kim et al.; A polyoxometalate coupled graphene oxide-Nafion composite membrane for fuel cellsoperating at low relative humidity† (Year: 2015).*

(Continued)

*Primary Examiner* — Amanda C. Walke
(74) *Attorney, Agent, or Firm* — Element IP, PLC

(57) ABSTRACT

To provide a polymer electrolyte membrane capable of producing a polymer electrolyte fuel cell excellent in power generation characteristics and excellent in hydrogen gas utilization efficiency, as well as a membrane electrode assembly and a polymer electrolyte fuel cell obtainable by using it.

The polymer electrolyte membrane of the present invention comprises a polymer electrolyte, of which the hydrogen gas permeation coefficient under the conditions of a temperature of 80° C. and a relative humidity of 10% is at most $2.4 \times 10^{-9}$ cm$^3$·cm/(s·cm$^2$·cmHg) and has a membrane thickness of from 7 to 20 μm.

20 Claims, 1 Drawing Sheet

(51) Int. Cl.
*H01M 8/1004* (2016.01)
*H01M 8/1023* (2016.01)
*H01M 8/10* (2016.01)

(52) U.S. Cl.
CPC ....... *H01M 8/1023* (2013.01); *C08F 2800/20* (2013.01); *H01M 2008/1095* (2013.01); *H01M 2300/0082* (2013.01)

(56) References Cited

U.S. PATENT DOCUMENTS

| | | |
|---|---|---|
| 2015/0030962 A1 | 1/2015 | Hommura et al. |
| 2019/0221874 A1 | 7/2019 | Saito et al. |
| 2019/0267655 A1 | 8/2019 | Yamaguchi et al. |

FOREIGN PATENT DOCUMENTS

| | | |
|---|---|---|
| EP | 3677571 A1 | 7/2020 |
| JP | 2002-216804 A | 8/2002 |
| JP | 2013-216811 A | 10/2013 |
| WO | WO 2013/157395 A1 | 10/2013 |
| WO | WO 2018/020826 A1 | 2/2018 |
| WO | WO 2018/061838 A1 | 4/2018 |

OTHER PUBLICATIONS

International Search Report dated May 26, 2020 in PCT/JP2020/008344, filed on Feb. 28, 2020, 2 pages.

\* cited by examiner

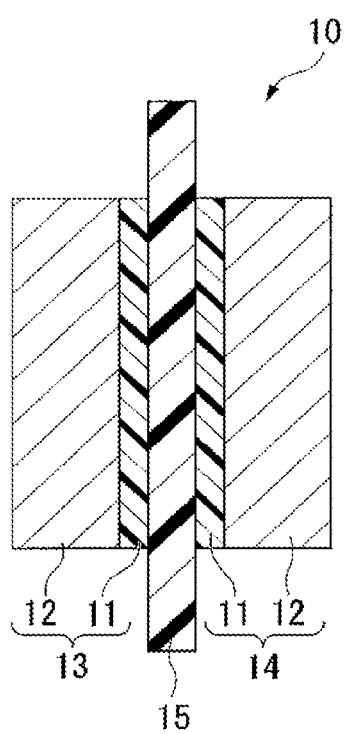

POLYMER ELECTROLYTE MEMBRANE, MEMBRANE ELECTRODE ASSEMBLY AND POLYMER ELECTROLYTE FUEL CELL

TECHNICAL FIELD

The present invention relates to a polymer electrolyte membrane, a membrane electrode assembly, and a polymer electrolyte fuel cell.

BACKGROUND ART

The polymer electrolyte fuel cell has, for example, a structure in which a membrane electrode assembly is sandwiched between two separators to form a cell, and a plurality of such cells are stacked. The membrane electrode assembly comprises an anode and a cathode each having a catalyst layer, and a polymer electrolyte membrane disposed between the anode and the cathode. The polymer electrolyte membrane is obtainable, for example, by forming a polymer having acid-type sulfonic acid groups into a membrane.

In an Example of Patent Document 1, as a polymer having acid-type sulfonic acid groups, a perfluoropolymer is disclosed, which is obtained by converting groups represented by —$SO_2F$ of a polymer obtained by copolymerizing $CF_2$=$CFOCF_2CF(CF_3)OCF_2CF_2SO_2F$ and tetrafluoroethylene, to an acid type.

PRIOR ART DOCUMENT

Patent Document

Patent Document 1: JP-A-2002-216804

DISCLOSURE OF INVENTION

Technical Problem

In recent years, further improvement in performance of polymer electrolyte fuel cells has been required. Specifically, polymer electrolyte fuel cells excellent in power generation characteristics and utilization efficiency of hydrogen gas as a fuel, have been required.

When the present inventors evaluated the polymer electrolyte membrane containing, as an electrolyte, the above-mentioned perfluoropolymer described in Patent Document 1, they found that with respect to at least one of the power generation characteristics and the utilization efficiency of hydrogen gas of the polymer electrolyte fuel cell, there was room for improvement.

In view of the above circumstances, the present invention has an object to provide a polymer electrolyte membrane capable of producing a polymer electrolyte fuel cell excellent in power generation characteristics and hydrogen gas utilization efficiency, as well as a membrane electrode assembly and a polymer electrolyte fuel cell obtainable by using it.

Solution to Problem

As a result of diligent studies on the above problem, the present inventors have found it possible to produce a polymer electrolyte fuel cell excellent in power generation characteristics and hydrogen gas utilization efficiency, by using a polymer electrolyte membrane comprising a polymer electrolyte, of which the hydrogen gas permeation coefficient is at most a predetermined value, and having a membrane thickness within a predetermined range, and thus have arrived at the present invention.

That is, the present inventors have found it possible to solve the above problem by the following constructions.

[1] A polymer electrolyte membrane characterized by comprising a polymer electrolyte, of which the hydrogen gas permeation coefficient under the conditions of a temperature of 80° C. and a relative humidity of 10%, is at most $2.4 \times 10^{-9}$ $cm^3 \cdot cm/(s \cdot cm^2 \cdot cmHg)$, and having a membrane thickness of from 7 to 20 µm.

[2] The polymer electrolyte membrane according to [1], wherein the polymer electrolyte is a perfluoropolymer having acid-type sulfonic acid groups.

[3] The polymer electrolyte membrane according to [2], wherein the perfluoropolymer contains perfluoromonomer units, and the perfluoromonomer units contain at least one type of units selected from the group consisting of perfluorovinyl ether units and perfluoroallyl ether units.

[4] The polymer electrolyte membrane according to [2] or [3], wherein the perfluoropolymer does not substantially contain at least one type of units selected from the group consisting of units having a halogen atom other than a fluorine atom, units having a ring structure, and units having a crosslinked structure consisting of a covalent bond.

[5] The polymer electrolyte membrane according to [3] or [4], wherein the perfluoroallyl ether units are units represented by the formula A-1 described later, and in the formula A-1, $R^{F1}$ and $R^{F2}$ are each independently a $C_{1-3}$ perfluoroalkylene group.

[6] The polymer electrolyte membrane according to any one of [3] to [5], wherein the perfluoromonomer units further contain tetrafluoroethylene units.

[7] The polymer electrolyte membrane according to any one of [1] to [6], wherein the ion exchange capacity of the polymer electrolyte is from 1.4 to 2.5 meq/g dry resin.

[8] A membrane electrode assembly characterized by comprising an anode having a catalyst layer, a cathode having a catalyst layer, and the polymer electrolyte membrane as defined in any one of [1] to [7], disposed between the anode and the cathode.

[9] The membrane electrode assembly according to [8], wherein the catalyst layer of the cathode contains a catalyst and a polymer having ion exchange groups, and the value obtained by subtracting the hydrogen gas permeation coefficient of the polymer electrolyte from the hydrogen gas permeation coefficient of the polymer having ion exchange groups, is at least $1.0 \times 10^{-8}$ $cm^3 \cdot cm/(s \cdot cm^2 \cdot cmHg)$.

[10] A polymer electrolyte fuel cell characterized by comprising the membrane electrode assembly as defined in [8] or [9].

Advantageous Effects of Invention

According to the present invention, it is possible to provide a polymer electrolyte membrane capable of producing a polymer electrolyte fuel cell excellent in power generation characteristics and hydrogen gas utilization efficiency, as well as a membrane electrode assembly and a polymer electrolyte fuel cell obtainable by using it.

BRIEF DESCRIPTION OF DRAWING

FIG. 1 is a schematic cross-sectional view which shows an example of the membrane electrode assembly of the present invention.

DESCRIPTION OF EMBODIMENTS

The following definitions of terms apply throughout the specification and claims unless otherwise specified.

An "ion exchange group" is a group capable of exchanging at least part of ions contained in this group with other ions, and, for example, the following sulfonic acid type functional group and carboxylic acid type functional group may be mentioned.

A "sulfonic acid type functional group" is a general term for an acid-type sulfonic acid group (—$SO_3H$) and a salt-type sulfonic acid group (—$SO_3M^2$, where $M^2$ is an alkali metal or a quaternary ammonium cation).

A "carboxylic acid type functional group" is a general term for an acid-type carboxylic acid group (—COOH) and a salt-type carboxylic acid group (—$COOM^1$, where $M^1$ is an alkali metal or a quaternary ammonium cation).

A "precursor membrane" is a membrane containing a polymer having groups that can be converted to ion exchange groups.

The "groups that can be converted to ion exchange groups" means groups that can be converted to ion exchange groups by a treatment such as a hydrolysis treatment or a treatment for conversion to an acid type, and may be referred to as "precursor groups".

A "group that can be converted to a sulfonic acid type functional group" means a group that can be converted to a sulfonic acid type functional group by a treatment such as a hydrolysis treatment or a treatment for conversion to an acid type.

A "group that can be converted to a carboxylic acid type functional group" means a group that can be converted to a carboxylic acid type functional group by a known treatment such as a hydrolysis treatment or a treatment for conversion to an acid type.

The term "does not substantially contain units" is meant that the content of the units relative to all units of the polymer containing the units is at most 1 mol %.

A "unit" in a polymer means an atomic group derived from one molecule of a monomer, formed by polymerization of the monomer. A unit may be an atomic group directly formed by the polymerization reaction, or may be an atomic group having a part of the atomic group changed to another structure by treating the polymer obtained by the polymerization reaction. Further, there may be a case where the structural unit derived from each monomer is described by a term having "unit" added to the monomer name.

A unit represented by the formula A-1 is referred to as a unit A-1. Units represented by other formulas may also be referred to in the same manner.

A compound represented by the formula 1-1 is referred to as a compound 1-1. Compounds represented by other formulas may also be referred to in the same manner.

[Polymer Electrolyte Membrane]

The polymer electrolyte membrane of the present invention (hereinafter simply referred to also as the "electrolyte membrane") comprises a polymer electrolyte, of which the hydrogen gas permeation coefficient under the conditions of a temperature of 80° C. and a relative humidity of 10%, is at most $2.4 \times 10^{-9}$ $cm^3 \cdot cm/(s \cdot cm^2 \cdot cmHg)$, and has a membrane thickness of from 7 to 20 μm.

According to the electrolyte membrane of the present invention, it is possible to produce a polymer electrolyte fuel cell excellent in power generation characteristics and hydrogen gas utilization efficiency. The details of this reason have not been clarified yet, but it is presumed to be due to the following reason.

The polymer electrolyte fuel cell generates electricity by supplying a gas containing oxygen to the cathode and a gas containing hydrogen to the anode. If the gas containing hydrogen supplied to the anode permeates through the electrolyte membrane and moves to the cathode side (so-called hydrogen crossover), there arises a problem that the hydrogen gas utilization efficiency in the polymer electrolyte fuel cell will be lowered.

With respect to this problem, the present inventors have found it possible to suppress the occurrence of hydrogen crossover by using an electrolyte membrane comprising a polymer electrolyte, of which the hydrogen gas permeation coefficient is at most a predetermined value, and as a result, it is possible to obtain a fuel cell excellent in utilization efficiency of hydrogen.

On the other hand, the present inventors have found that the power generation characteristics of the polymer electrolyte fuel cell are slightly improved by setting the hydrogen gas permeation coefficient to be at most a predetermined value, but there is room for improvement.

With respect to this problem, the present inventors have found that when the membrane thickness of the electrolyte membrane is set to be within a predetermined range, the resistance of the electrolyte membrane can be sufficiently lowered, and, as a result, it is possible to obtain a polymer electrolyte fuel cell excellent in power generation characteristics. That is, it is assumed that the effect of setting the hydrogen gas permeation coefficient of the polymer electrolyte to be at most a predetermined value and the effect of setting the membrane thickness of the electrolyte membrane within a predetermined range, act synergistically, whereby a polymer electrolyte fuel cell excellent in the power generation characteristics have been obtained.

<Polymer Electrolyte>

The polymer electrolyte is not particularly limited as long as it is an electrolyte made of a polymer, of which the hydrogen gas permeation coefficient satisfies the range as described later, but from such a viewpoint that the power generation characteristics of the polymer electrolyte fuel cell will be more excellent, it is preferably a perfluoropolymer having acid-type sulfonic acid groups (hereinafter simply referred to also as "polymer H").

Polymer H preferably contains perfluoromonomer units from the viewpoint of excellent durability of the electrolyte membrane.

The perfluoromonomer units preferably contain at least one type of units selected from the group consisting of perfluorovinyl ether units and perfluoroallyl ether units (hereinafter referred to also as "units A"), since the power generation characteristics of the polymer electrolyte fuel cell will be more excellent.

The units A may contain one or both of perfluorovinyl ether units and perfluoroallyl ether units, but it is preferred to contain perfluoroallyl ether units from the viewpoint of easy synthesis, and perfluoroallyl ether units are particularly preferred.

The units contained in the units A preferably have an ion exchange group, since the resistance of the electrolyte membrane becomes low, and the power generation characteristics of the polymer electrolyte fuel cell will be more excellent, and it is more preferred to have a sulfonic acid type functional group, and it is particularly preferred to have an acid-type sulfonic acid type functional group.

When the respective units contained in the units A have an ion exchange group, the number of ion exchange groups in the respective units is preferably at least 2 from such a viewpoint that the resistance of the electrolyte membrane will be low, and the power generation characteristics of the polymer electrolyte fuel cell will be more excellent, and particularly preferably 2 from such a viewpoint that the synthesis will be easy.

As the perfluoroallyl ether units, units A-1 are preferred, since a polymer electrolyte, of which the hydrogen gas permeation coefficient is in the range described later will easily be obtainable.

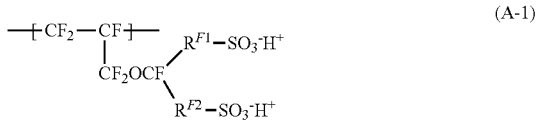

As the perfluorovinyl ether units, units A-2 or units A-3 are preferred from such a viewpoint that a polymer electrolyte, of which the hydrogen gas permeation coefficient is in the range described later will easily be obtainable.

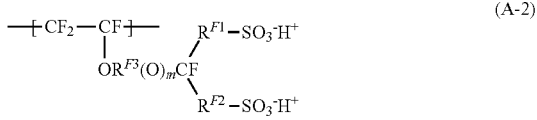

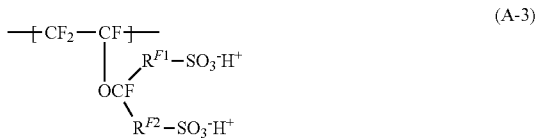

In the formulas A-1 to A-3, $R^{F1}$ and $R^{F2}$ are each independently a $C_{1-3}$ perfluoroalkylene group.

Specific examples of $R^{F1}$ and $R^{F2}$ may be —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$—, and —$C(CF_3)(CF_3)$—.

From such a viewpoint that the raw material is inexpensive, from such a viewpoint that the production is easy, and from such a viewpoint that the ion exchange capacity of polymer H can be made to be higher, $RF^1$ and $RF^2$ are each independently preferably a $C_{1\ or\ 2}$ perfluoroalkylene group. In the case of 2 carbon atoms, a straight chain is preferred. Specifically, —$CF_2$—, —$CF_2CF_2$— or —$CF(CF_3)$— is preferred, —$CF_2$— or —$CF_2CF_2$— is more preferred, and —$CF_2$— is particularly preferred.

In the formula A-2, $RF^3$ is a $C_{1-6}$ perfluoroalkylene group.

Specific examples of $R^{F3}$ may be —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$—, —$C(CF_3)(CF_3)$—, and —$CF_2CF(CF_3)OCF_2CF\ (CF_3)$—.

From such a viewpoint that the raw material is inexpensive, from such a viewpoint that the production is easy, and from such a viewpoint that the ion exchange capacity of polymer H can be made higher, $RF^3$ is preferably a $C_{1-3}$ perfluoroalkylene group. Specifically, —$CF_2$—, —$CF_2CF_2$— or —$CF_2CF(CF_3)$— is preferred, and —$CF_2CF(CF_3)$— is particularly preferred.

In the formula A-2, m is 0 or 1.

The perfluoromonomer units may include units other than the units A. As the units other than the units A, perfluoromonomer units which do not have an ion exchange group or its precursor group may be mentioned.

As specific examples of the perfluoromonomer units which do not have an ion exchange group or its precursor group, tetrafluoroethylene (hereinafter referred to also as "TFE") units and hexafluoropropylene units may be mentioned, and the TFE units are preferred from such a viewpoint that strength of the electrolyte membrane will be excellent.

The lower limit of the content of the units A is, from such a viewpoint that it will be easy to set the ion exchange capacity of the electrolyte membrane within the range described later, and that a polymer electrolyte, of which the hydrogen gas permeation coefficient is within the range described later, can be easily obtained, preferably 7 mol %, more preferably 8 mol %, particularly preferably 9 mol %, to all units in polymer H.

The upper limit of the content of the units A is, from such a viewpoint that strength of the electrolyte membrane will be excellent, preferably 45 mol %, more preferably 36 mol %, particularly preferably 22 mol %, to all units in polymer H.

In a case where perfluoromonomer units which do not have an ion exchange group or its precursor group are contained, the content thereof is preferably from 55 to 93 mol %, more preferably from 65 to 92 mol %, particularly preferably 78 to 91 mol %, to all units in polymer H. Such a content is particularly suitable in a case where the perfluoromonomer units are TFE units.

Polymer H preferably does not substantially contain units having a halogen atom other than a fluorine atom (hereinafter referred to also as "units X1"). The chain transfer reaction is thereby less likely to occur at the time of producing polymer H by polymerizing a monomer, and the amount of oligomers formed during the production is less.

Specific examples of the units X1 may be chlorotrifluoroethylene units, bromotrifluoroethylene units, iodotrifluoroethylene units, and dichlorodifluoroethylene units.

"Polymer H does not substantially contain units X1" means that the content of the units X1 is at most 1 mol % to all units in polymer H, and it is preferred that polymer H does not contain them (0 mol %).

Polymer H preferably does not substantially contain units having a ring structure (hereinafter referred to also as "units X2"). Polymer H is thereby suppressed from becoming brittle, and the toughness of polymer H will be high, so that the mechanical strength of the electrolyte membrane obtainable by using polymer H will be excellent.

As the ring structure, an aliphatic hydrocarbon ring, an aliphatic heterocycle, an aromatic hydrocarbon ring, or an aromatic heterocycle may be mentioned. The ring structure may be present in the main chain or in the side chain.

As specific examples of the units X2, the units having a cyclic ether structure as described in Japanese Patent No. 4997968 and Japanese Patent No. 5454592 may be mentioned.

The meaning of "polymer H does not substantially contain the units X2" is the same as that with respect to the units X1, and it is preferred that polymer H does not contain the units X2 (0 mol %).

Polymer H preferably does not substantially contain units having a crosslinked structure consisting of a covalent bond (hereinafter referred to also as "units X3"). This makes it easier for polymer H to be dissolved or dispersed in the liquid medium, so that in a case where an electrolyte membrane is to be formed by using the liquid composition containing polymer H and the liquid medium, the electrolyte membrane can be made to be thin.

The crosslinked structure consisting of a covalent bond is a structure in which a monomer having a crosslinkable group (for example, a vinyl group, a perfluorovinyl group, etc.) that can be crosslinked by a covalent bond is polymerized, and then the crosslinkable group is crosslinked by the covalent bond, or a structure obtained by crosslinking a monomer having a crosslinkable group that can be crosslinked by a covalent bond, at the same time as the polymerization reaction.

As a specific example of the units X3, units may be mentioned which have a structure such that after polymerizing compounds of the formulas 8 to 15 described in JP-A-2001-176524 (compounds having two crosslinkable groups), a crosslinkable group that was not used in the polymerization, is crosslinked by a covalent bond.

The meaning of "polymer H does not substantially contain the units X3" is the same as that with respect to the units X1, and it is preferred that polymer H does not contain the units X3 (0 mol %).

(Method for Producing Polymer Electrolyte)

As an example of the method for producing a polymer electrolyte, the above-mentioned method for producing polymer H will be referred to for the description.

As an example of the method for producing polymer H, a method may be mentioned in which precursor groups of a precursor polymer (hereinafter referred to also as "polymer F") in which acid-type sulfonic acid groups (specifically groups represented by —$SO_2F$) in polymer H are precursor groups, are converted to acid-type sulfonic acid groups (—$SO_3^-H^+$).

As a specific example of the method of converting the groups represented by —$SO_2F$ being precursor groups, to acid-type sulfonic acid groups, a method may be mentioned in which the groups represented by —$SO_2F$ of polymer F are hydrolyzed to form salt-type sulfonic acid groups, and then, converting the salt-type sulfonic acid groups to an acid-type to form acid-type sulfonic acid groups.

Polymer F is preferably a perfluoropolymer containing perfluoromonomer units and having groups represented by —$SO_2F$.

The perfluoromonomer units in polymer F preferably contain at least one type of units (hereinafter referred to also as "units a") selected from the group consisting of perfluorovinyl ether units and perfluoroallyl ether units.

The units a may contain one or both of the perfluorovinyl ether units and the perfluoroallyl ether units, but it is preferred that they contain the perfluoroallyl ether units from such a viewpoint that the synthesis is easy, and particularly preferably, they are the perfluoroallyl ether units.

The units contained in the units a may have a precursor group for an ion exchange group or may not have a precursor group for an ion exchange group, but preferably they have a precursor group for an ion exchange group, particularly preferably they have a precursor group for a sulfonic acid type functional group (specifically a group represented by —$SO_2F$).

As a specific example of the perfluorovinyl ether units in the units a, units may be mentioned in which the acid-type sulfonic acid groups of the perfluorovinyl ether units in the units A as described above are changed to groups represented by —$SO_2F$.

As the perfluoroallyl ether units in the units a, the units a-1 are preferred.

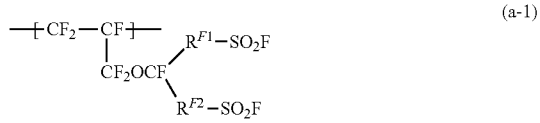

(a-1)

$R^{F1}$ and $R^{F2}$ in the formula a-1 are, respectively, synonymous with $R^{F1}$ and $R^{F2}$ in the formula A-1.

The perfluoromonomer units in the units a may contain units other than the units a. A specific example of the units other than the units a may be perfluoromonomer units which do not have an ion exchange group or its precursor group.

Specific examples of the perfluoromonomer units which do not have an ion exchange group or its precursor group are the same as those for polymer H.

The contents of the respective units in polymer F are preferably the same as the contents of the respective units in polymer H.

Polymer F preferably does not substantially contain at least one type of units selected from the group consisting of units having a halogen atom other than a fluorine atom, units having a ring structure, and units having a crosslinked structure consisting of a covalent bond, and it is particularly preferred that it does not substantially contain all of these units.

Specific examples of the units having a halogen atom other than a fluorine atom, the units having a ring structure, and the units having a crosslinked structure consisting of a covalent bond, are the same as those in polymer H.

Here, "does not substantially contain" has the same meaning as in the case of polymer H.

The TQ value of polymer F is preferably at least 220° C., more preferably from 225 to 360° C., further preferably from 230 to 350° C. When the TQ value is at least the lower limit value, polymer H having a sufficient molecular weight can be obtained, so that the strength of the electrolyte membrane will be excellent. When the TQ value is at most the upper limit value, the solubility or dispersibility of polymer H in the liquid medium will be improved, so that it will be easy to prepare a liquid composition. The TQ value is an index for the molecular weight of polymer F.

The "TQ value" of polymer F is obtainable by the method as described in the section for Examples given later.

<Physical Characteristics>

The hydrogen gas permeation coefficient of the polymer electrolyte under the conditions of a temperature of 80° C. and a relative humidity of 10% is at most $2.4 \times 10^{-9}$ $cm^3 \cdot cm/(s \cdot cm^2 \cdot cmHg)$, preferably at most $2.2 \times 10^{-9}$ $cm^3 \cdot cm/(s \cdot cm^2 \cdot cmHg)$, more preferably at most $2.0 \times 10^{-9}$ $cm^3 \cdot cm/(s \cdot cm^2 \cdot cmHg)$, particularly preferably at most $1.8 \times 10^{-9}$ $cm^3 \cdot cm/(s \cdot cm^2 \cdot cmHg)$. When the hydrogen gas permeation coefficient is at most the upper limit value, it is possible to suppress the occurrence of hydrogen crossover.

The hydrogen gas permeation coefficient of the polymer electrolyte under the conditions of a temperature of 80° C. and a relative humidity of 10% is, from such a viewpoint that the resistance value of the electrolyte membrane can be lowered, and the power generation characteristics of the polymer electrolyte fuel cell can be further improved, preferably at least $1.0 \times 10^{-12}$ $cm^3 \cdot cm/(s \cdot cm^2 \cdot cmHg)$, more preferably at least $1.0 \times 10{-11}$ $cm^3 \cdot cm/(s \cdot cm^2 \cdot cmHg)$.

The "hydrogen gas permeation coefficient" of the polymer electrolyte is obtainable by the method described in the section for Examples given later, by using a membrane having a thickness of 25 μm, made of the polymer electrolyte.

The ion exchange capacity of the polymer electrolyte is preferably from 1.4 to 2.5 meq/g dry resin, more preferably from 1.6 to 2.4 meq/g dry resin, particularly from 1.8 to 2.3 meq/g dry resin. When the ion exchange capacity of the polymer electrolyte is at least the lower limit value, the resistance of the electrolyte membrane obtainable by using it, can be lowered, and as a result, the power generation characteristics of the polymer electrolyte fuel cell can be further improved. When the ion exchange capacity of the polymer electrolyte is at most the upper limit value, the strength at the time of being made into the electrolyte membrane will be excellent.

The "ion exchange capacity" of the polymer electrolyte is obtainable by the method as described in the section for Examples given later.

The membrane thickness of the electrolyte membrane is from 7 to 20 μm, and the lower limit value in the above range is preferably 10 μm, particularly preferably 13 μm, and the upper limit value in the above range is preferably 18 μm. When the membrane thickness of the electrolyte membrane is at least the lower limit value in the above range, the occurrence of hydrogen crossover can be further suppressed, and the mechanical strength will be excellent, and when it is at most the upper limit value in the above range, the resistance value of the electrolyte membrane can be lowered to further improve the power generation characteristics of the polymer electrolyte fuel cell.

The membrane thickness of the electrolyte membrane means the average membrane thickness obtainable by the method as described in the section for Examples given later.

<Other Materials>

The electrolyte membrane may be reinforced by a reinforcing material. Specific examples of the reinforcing material may be porous bodies, fibers, woven fabrics and non-woven fabrics.

The reinforcing material is preferably made of a material selected from the group consisting of polytetrafluoroethylene (hereinafter referred to also as "PTFE"), a tetrafluoroethylene-perfluoroalkyl vinyl ether copolymer (hereinafter referred to also as "PFA"), polyetheretherketone (hereinafter referred to also as "PEEK"), and polyphenylene sulfide (hereinafter referred to also as "PPS").

The electrolyte membrane may contain at least one type of metal, metal compound or metal ion, which contains a metal selected from the group consisting of cerium and manganese in order to further improve durability. Cerium and manganese will decompose hydrogen peroxide, which is a causative substance that causes degradation of the electrolyte membrane.

The electrolyte membrane may contain silica or heteropolyacid (e.g. zirconium phosphate, phosphomolybdic acid, or phosphotungstic acid), as a water retention agent to prevent drying.

<Application>

The electrolyte membrane is suitably used as a polymer electrolyte membrane for a polymer electrolyte fuel cell.

<Method for Producing Electrolyte Membrane>

An example of a method for producing an electrolyte membrane may be a method in which a liquid composition described later is applied to the surface of a base film or a catalyst layer and dried (cast method).

An example of the production method in a case where the electrolyte membrane contains a reinforcing material, may be a method of impregnating the reinforcing material with a liquid composition described later and drying it.

It is preferred to carry out heat treatment in order to stabilize the electrolyte membrane. The temperature for the heat treatment may depend on the type of the polymer electrolyte, but is preferably from 130 to 200° C. When the heat treatment temperature is at least 130° C., the water content of the polymer electrolyte becomes to be proper. When the heat treatment temperature is at most 200° C., the thermal decomposition of sulfonic acid groups will be suppressed, and the excellent conductivity of the electrolyte membrane can be maintained.

The electrolyte membrane may be treated with a hydrogen peroxide solution, if necessary.

(Liquid Composition)

The liquid composition preferably comprises a polymer electrolyte and a liquid medium. The polymer electrolyte in the liquid composition may be dispersed in the liquid medium or may be dissolved in the liquid medium.

As specific examples of the liquid medium, water and an organic solvent may be mentioned. As the liquid medium, only water may be used, only an organic solvent may be used, or a mixed solvent of water and an organic solvent may be used, but it is preferred to use a mixed solvent of water and an organic solvent.

In a case where water is contained as the liquid medium, the dispersibility or solubility of the polymer electrolyte in the liquid medium will easily be improved. In a case where an organic solvent is contained as the liquid medium, an electrolyte membrane which is hardly breakable will easily be obtainable.

As the organic solvent, a $C_{1-4}$ alcohol is preferred, from such a viewpoint that a hardly breakable electrolyte membrane will easily be obtainable.

As the $C_{1-4}$ alcohol, for example, methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, or 3,3,3-trifluoro-1-propanol may be mentioned.

As the organic solvent, one type may be used alone, or two or more types may be used in combination.

In a case where the liquid medium is a mixed solvent of water and an organic solvent, the content of water is preferably from 10 to 99 mass %, particularly preferably from 20 to 99 mass %, to the total mass of the liquid medium.

In a case where the liquid medium is a mixed solvent of water and an organic solvent, the content of the organic solvent is preferably from 1 to 90 mass %, particularly preferably from 1 to 80 mass %.

When the contents of water and the organic solvent are within the above ranges, an electrolyte membrane having excellent dispersibility or solubility of the polymer electrolyte in the liquid medium and being hardly breakable will easily be obtainable.

The content of the polymer electrolyte is preferably from 1 to 50 mass %, particularly preferably from 3 to 30 mass %, to the total mass of the liquid composition. When it is at least the lower limit value in the above range, a thick membrane can be stably obtained at the time of formation of a membrane. When it is at most the upper limit value in the above range, the viscosity of the liquid composition will become proper.

The liquid composition may contain at least one type of metal, metal compound or metal ion, which contains a metal selected from the group consisting of cerium and manganese in order to further improve the durability of the electrolyte membrane made from the liquid composition.

[Membrane Electrode Assembly]

The membrane electrode assembly of the present invention comprises an anode having a catalyst layer, a cathode having a catalyst layer, and the above-described electrolyte membrane disposed between the anode and the cathode.

Since the membrane electrode assembly of the present invention contains the above-mentioned electrolyte membrane, the polymer electrolyte fuel cell obtainable by using the membrane electrode assembly will be excellent in power generation characteristics and hydrogen gas utilization efficiency.

Hereinafter, an example of the membrane electrode assembly of the present invention will be described with reference to the drawing.

FIG. 1 is a schematic cross-sectional view showing an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and an electrolyte membrane 15 disposed between the anode 13 and the cathode 14, in contact with the catalyst layers 11.

A specific example of the catalyst layer 11 may be a layer containing a catalyst and a polymer having ion exchange groups.

A specific example of the catalyst may be a supported catalyst in which platinum, a platinum alloy or a catalyst containing platinum with a core-shell structure, is supported on a carbon carrier, an iridium oxide catalyst, an alloy containing iridium oxide, and a catalyst containing iridium oxide having a core-shell structure. As the carbon carrier, carbon black powder may be mentioned.

A specific example of the polymer having ion exchange groups may be polymer H, or a perfluoropolymer having ion exchange groups other than polymer H (hereinafter referred to also as "polymer H'").

Polymer H' preferably comprises units based on a fluorinated olefin and units having a sulfonic acid type functional group and a fluorine atom. Polymer H' may contain units other than these.

The fluorinated olefin may be TFE, chlorotrifluoroethylene, vinylidene fluoride, vinyl fluoride, or hexafluoropropylene, and TFE is particularly preferred. As the fluorinated olefin, one type may be used alone, or two or more types may be used in combination.

As the units having a sulfonic acid type functional group and a fluorine atom, units represented by the formula (1-1), units represented by the formula (1-2), or units represented by the formula (1-3) are preferred.

As the units having a sulfonic acid type functional group and a fluorine atom, one type may be used alone, or two or more types may be used in combination.

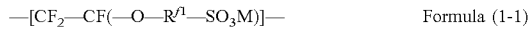
—[CF$_2$—CF(—O—R$^{f1}$—SO$_3$M)]—      Formula (1-1)

—[CF$_2$—CF(—R$^{f1}$—SO$_3$M)]—      Formula (1-2)

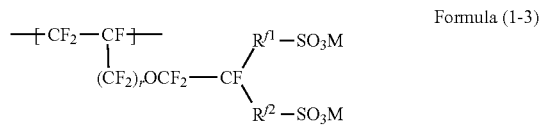
Formula (1-3)

$R^{f1}$ is a perfluoroalkylene group which may contain an oxygen atom between carbon-carbon atoms. The number of carbon atoms in the perfluoroalkylene group is preferably at least 1, particularly preferably at least 2, and preferably at most 20, particularly preferably at most 10.

$R^{f2}$ is a single bond or a perfluoroalkylene group which may contain an oxygen atom between carbon-carbon atoms.

The number of carbon atoms in the perfluoroalkylene group is preferably at least 1, particularly preferably at least 2, and preferably at most 20, particularly preferably at most 10.

r is 0 or 1.

M is a hydrogen atom, an alkali metal or a quaternary ammonium cation.

Specific examples of the units (1-1) may be the following units 1-1-1 to 1-1-3.

In the formulas, w is an integer of from 1 to 8, and x is an integer of from 1 to 5. The definition of M in the formulas is as described above.

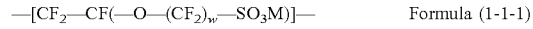
—[CF$_2$—CF(—O—(CF$_2$)$_w$—SO$_3$M)]—      Formula (1-1-1)

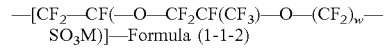
—[CF$_2$—CF(—O—CF$_2$CF(CF$_3$)—O—(CF$_2$)$_w$—SO$_3$M)]—Formula (1-1-2)

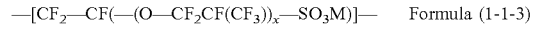
—[CF$_2$—CF(—(O—CF$_2$CF(CF$_3$))$_x$—SO$_3$M)]—      Formula (1-1-3)

As specific examples of the units (1-2), the following units may be mentioned. In the formulas, w is an integer from 1 to 8. The definition of M in the formulas is as described above.

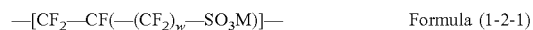
—[CF$_2$—CF(—(CF$_2$)$_w$—SO$_3$M)]—      Formula (1-2-1)

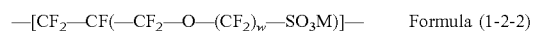
—[CF$_2$—CF(—CF$_2$—O—(CF$_2$)$_w$—SO$_3$M)]—      Formula (1-2-2)

As the units (1-3), units represented by the following formula (1-3-1) are preferred. The definition of M in the formula is as described above.

In the formula (1-3-1), $R^{f4}$ is a $C_{1-6}$ linear perfluoroalkylene group, and $R^{f5}$ is a single bond or a $C_{1-6}$ linear perfluoroalkylene group which may contain an oxygen atom between carbon-carbon atoms. The definitions of r and M are as described above.

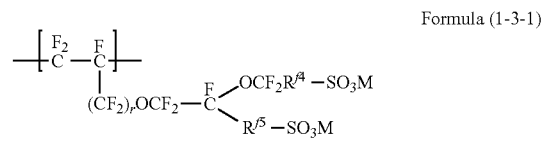
Formula (1-3-1)

The value (Hc−Hk) obtained by subtracting the hydrogen gas permeation coefficient (hereinafter referred to also as "Hk") of the above-mentioned polymer electrolyte contained in the electrolyte membrane from the hydrogen gas permeation coefficient (hereinafter referred to also as "Hc") of the polymer having ion exchange groups in the catalyst layer of the cathode, is preferably at least $1.0 \times 10^{-8}$ cm$^3 \cdot$cm/(s$\cdot$cm$^2 \cdot$cmHg), more preferably at least $1.3 \times 10^{-8}$ cm$^3 \cdot$cm/(s$\cdot$cm$^2 \cdot$cmHg), further preferably at least $1.5 \times 10^{-8}$ cm$^3 \cdot$cm/(s$\cdot$cm$^2 \cdot$cmHg), particularly preferably at least $1.7 \times 10^{-8}$ cm$^3 \cdot$cm/(s$\cdot$cm$^2 \cdot$cmHg).

The upper limit of the value of Hc−Hk is not particularly limited, and the higher the better, but, for example, it is $2.5 \times 10^{-8}$ cm$^3 \cdot$cm/(s$\cdot$cm$^2 \cdot$cmHg).

When the value of Hc−Hk is within the above range, the power generation characteristics of the polymer electrolyte fuel cell will be more excellent. The reason for this has not been completely clarified yet, but it is presumed to be due to the following reason.

When the hydrogen gas permeation coefficient becomes low, the amount of permeated hydrogen decreases, but the amount of permeated oxygen also tends to decrease. Therefore, if Hc at the cathode to which the gas containing oxygen is supplied is low, the supply of oxygen to the catalyst surface, which is the reaction field, will be hindered.

With respect to this problem, if the value of Hc−Hk is within the above range, it is possible to promote the supply of oxygen to the catalyst surface in the cathode side catalyst layer while suppressing hydrogen crossover from the anode to the cathode, and therefore it is presumed that due to these synergistic actions, a polymer electrolyte fuel cell with superior power generation characteristics has been obtained.

Here, the hydrogen gas permeation coefficient of the polymer having ion exchange groups in the catalyst layer of the cathode is obtainable by the method as described in the section for Examples given later.

The gas diffusion layer 12 has a function to uniformly diffuse gas in the catalyst layer and a function as a current collector. Specific examples of the gas diffusion layer may be carbon paper, carbon cloth, carbon felt, and a titanium porous material (specifically sintered product of titanium particles or fibers, etc.).

In order to prevent adhesion of the generated gas, the gas diffusion layer may be treated for water-repellency or hydrophilized with PTFE or the like, or may be hydrophilized with a polymer having ion exchange groups or the like.

Although the gas diffusion layer 12 is contained in the membrane electrode assembly in FIG. 1, the gas diffusion layer is an optional member and may not be contained in the membrane electrode assembly.

The electrolyte membrane 15 is an electrolyte membrane (polymer electrolyte membrane) containing the above-mentioned polymer electrolyte.

The anode 13 and the cathode 14 may have another component other than the above.

As a specific example of another component, a carbon layer (not shown) to be provided between the catalyst layer 11 and the gas diffusion layer 12 may be mentioned. When the carbon layer is disposed, the gas diffusion property at the surface of the catalyst layer 11 will be improved, whereby it is possible to further improve the power generation performance of the fuel cell.

The carbon layer may, for example, comprise carbon and a nonionic fluorinated polymer. As a specific example of carbon, a carbon nanofiber having a fiber diameter of from 1 to 1,000 nm and a fiber length of at most 1,000 μm is preferred. As a specific example of the nonionic fluorinated polymer, PTFE may be mentioned.

Specific examples of the method for producing the membrane electrode assembly may be a method in which catalyst layers are formed on an electrolyte membrane and the obtained assembly is further sandwiched between gas diffusion layers, and a method in which a catalyst layer is formed on a gas diffusion layer to form electrodes (anode, cathode), and an electrolyte membrane is sandwiched between the electrodes.

Here, the method for producing the catalyst layer may be a method in which a coating liquid for forming a catalyst layer is applied to a predetermined position and dried as the case requires. The coating liquid for forming a catalyst layer is a liquid having a polymer having ion exchange groups and a catalyst, dispersed in a dispersion medium.

[Polymer Electrolyte Fuel Cell]

The polymer electrolyte fuel cell of the present invention contains the above-mentioned membrane electrode assembly.

Since the polymer electrolyte fuel cell of the present invention contains the above-mentioned membrane electrode assembly, it is excellent in power generation characteristics and hydrogen gas utilization efficiency.

The polymer electrolyte fuel cell of the present invention may have, on both sides of the membrane electrode assembly, separators having grooves formed as gas flow fields.

As specific examples of the separator, a separator made of metal, a separator made of carbon, a separator made of material having graphite and a resin mixed, and a separator made of various conductive materials, may be mentioned.

In the polymer electrolyte fuel cell, the power generation is conducted by supplying a gas containing oxygen to the cathode, and a gas containing hydrogen to the anode.

EXAMPLES

Hereinafter, the present invention will be described in detail with reference to Examples. Ex. 6-1 to 6-8 and 7-1 to 7-10 are Examples of the present invention, and Ex. 6-9 to 6-16 and 7-11 to 7-18 are Comparative Examples. However, the present invention is not limited to these Examples. Further, the blending amounts of the respective components in Tables given later, are based on mass standard.

[$^{1}$H-NMR]

$^{1}$H-NMR was measured under the conditions of frequency: 300.4 MHz and chemical shift standard: tetramethylsilane. As the solvent, $CD_3CN$ was used unless otherwise specified. The quantification of the product was carried out from the analysis result of $^{1}$H-NMR and the added amount of the internal standard sample (1,3-bis(trifluoromethyl)benzene).

[$^{19}$F-NMR]

$^{19}$F-NMR was measured under the conditions of frequency: 282.7 MHz, solvent: $CD_3CN$, and chemical shift standard: $CFCl_3$. The quantification of the product was carried out from the analysis result of $^{19}$F-NMR and the added amount of the internal standard sample (1,3-bis(trifluoromethyl)benzene).

[$^{13}$C-NMR]

$^{13}$C-NMR was measured under the conditions of frequency: 75.5 MHz and chemical shift standard: tetramethylsilane. As the solvent, $CD_3CN$ was used unless otherwise specified.

[Ion Exchange Capacity]

A membrane of polymer F or polymer F' was vacuum-dried at 120° C. for 12 hours. The mass of the membrane of the polymer after drying was measured, and then, the membrane of the polymer was immersed in a 0.85 mol/g sodium hydroxide solution (solvent: water/methanol=10/90 (mass ratio)) at 60° C. for at least 72 hours, to hydrolyze groups represented by —$SO_2F$. The sodium hydroxide solution after the hydrolysis was back-titrated with 0.1 mol/L hydrochloric acid to obtain the ion exchange capacity of polymer F or polymer F'. In the present specification, the ion exchange capacity of polymer H or polymer H' as a polymer electrolyte is described as being the same as the ion exchange capacity measured by using polymer F or polymer F' as a precursor.

[Proportions of Respective Units]

The proportions of the respective units in polymer F or polymer F' were calculated from the ion exchange capacity of polymer F or polymer F'.

The proportions of the respective units in polymer H or polymer H' are the same as the proportions of the corresponding respective units in polymer F or polymer F'.

[Hydrogen Gas Permeation Coefficient]

The hydrogen gas permeation coefficient of a membrane (membrane thickness: 25 μm) made of polymer H or polymer H' as a polymer electrolyte was measured in accordance with JIS K 7126-2: 2006. As the measuring device, a gas transmittance measuring device (GTR-100XFAG, manufactured by GTR Tech Co., Ltd.) was used.

A membrane made of polymer H or polymer H' with an effective permeation area of 9.62 cm$^2$ was kept at 80° C., and hydrogen gas having a relative humidity of 10% was permitted to flow on a first surface at 30 mL/min, and argon gas having a relative humidity of 10% was permitted to flow on a second surface at 30 mL/min. The hydrogen gas permeating to the argon gas was detected by gas chromatography, and the amount of hydrogen gas permeated as converted to a volume at 25° C. under 1 atm was obtained. Using the obtained amount of hydrogen gas permeated, the permeability of the gasper second per 1 cm$^2$ of the membrane area and 1 cm Hg of the pressure difference of the permeated gas, was obtained, and the value converted as a 1 cm thick membrane was adopted as the hydrogen gas permeation coefficient. Here, the standard size and membrane thickness of the membrane used in the calculation, were measured under the conditions of temperature: 23° C. and relative humidity: 50% RH.

[Initial Power Generation Characteristics]

The membrane electrode assembly was assembled into a power generation cell, and while maintaining the temperature of the membrane electrode assembly at 95° C., hydrogen gas (utilization rate 70%) was supplied to the anode, and air (utilization rate 50%) was supplied to the cathode, as pressurized to 151 kPa (absolute pressure). The humidification of the gas was a relative humidity of 20% RH for both hydrogen and air, and the cell voltage at the time when the current density was 2 A/cm$^2$ was recorded and evaluated according to the following standards. The higher the cell voltage, the better the power generation characteristics of the polymer electrolyte fuel cell.

⊚⊚: The cell voltage is at least 0.43 V.
⊚: The cell voltage is at least 0.40 V and less than 0.43 V.
◯: The cell voltage is at least 0.37 V and less than 0.40 V.
x: The cell voltage is less than 0.37 V.

[Hydrogen Leak Amount]

The hydrogen leak amount permeating from the anode side to the cathode side by permeating through the electrolyte membrane of the membrane electrode assembly, is quantified as the oxidation current value of hydrogen on the cathode side by the linear sweep voltammetry method. The test is carried out by supplying hydrogen (0.05 mL/min) and nitrogen (0.2 mL/min) to the anode and cathode, respectively, under ambient pressure, and sweeping the potential on the cathode side at a sweep rate of 0.5 mV/sec from 0.05 V to 0.5 V using the anode side as the reference electrode, at a cell temperature of 80° C. and a relative humidity of hydrogen and nitrogen: 100% RH. In the obtainable relationship of the current density to the potential, the value of the intercept of the linear approximation formula in the range of from 0.4 to 0.5 V was taken as the hydrogen leak current value and evaluated in accordance with the following standards. The smaller the hydrogen leak current value, the better the hydrogen gas utilization efficiency in the polymer electrolyte fuel cell.

⊚: The hydrogen leak current value is at most 2.5 mA/cm$^2$.
◯: The hydrogen leak current value is more than 2.5 mA/cm$^2$ and at most 4.0 mA/cm$^2$.
x: The hydrogen leak current value is more than 4.0 mA/cm$^2$.

[Membrane Thickness]

A polymer electrolyte membrane was measured by a digital indicator (manufactured by Mitutoyo Corporation, ID-C112XB), and an average thickness was calculated by arithmetically averaging the thicknesses of optional 6 points. Here, the membrane thickness was measured under the conditions of temperature: 23° C. and relative humidity: 50% RH.

[TQ Value]

Using a flow tester (CFT-500A, manufactured by Shimadzu Corporation) equipped with a nozzle having a length of 1 mm and an inner diameter of 1 mm, polymer F or F' was melt extruded by changing the temperature under an extrusion pressure of 2.94 MPa (gauge pressure). A temperature (TQ value) at which the extrusion amount of polymer F or F' becomes to be 100 mm$^3$/sec was obtained. The higher the TQ value, the larger the molecular weight of the polymer.

[Glass Transition Temperature]

With respect to a membrane of polymer F or F', using a dynamic viscoelasticity measuring device (manufactured by IT Measurement Control Co., Ltd., DVA-225), the dynamic viscoelasticity measurement was carried out under the conditions of sample width: 5.0 mm, length between grips: 15 mm, measurement frequency: 1 Hz, heating rate: 2° C./min, and tension mode. tan δ (tangent loss) was calculated from the ratio (E"/E') of loss elastic modulus E" to storage elastic modulus E', and a tan δ-temperature curve was prepared. The value obtained by reading the peak temperature between −100 and 200° C. from the tan δ-temperature curve, was taken as the glass transition temperature (Tg) of polymer F or F'.

[Abbreviations]

TFE: Tetrafluoroethylene,
PSVE: $CF_2$=$CFOCF_2CF(CF_3)OCF_2CF_2SO_2F$,
PFtBPO: $(CF_3)_3COOC(CF_3)_3$,
AIBN: $(CH_3)_2C(CN)N$=$NC(CH_3)_2(CN)$,
HFC-52-13p: $CF_3(CF_2)_5H$,
HFE-347pc-f: $CF_3CH_2OCF_2CF_2H$,
HCFC-225cb: $CClF_2CF_2CHClF$,
HCFC-141b: $CH_3CCl_2F$.

Ex. 1

Ex. 1-1

Into a 2 L four-necked flask equipped with a stirrer, a condenser, a thermometer and a dropping funnel, 560 g of chlorosulfonic acid was charged under nitrogen gas sealing. The flask was cooled in an ice bath, and while maintaining the internal temperature to be at most 20° C., a mixed solution of 139.5 g of compound 1-1 and 478.7 g of dichloromethane, was dropwise added over 20 minutes. During the dropwise addition, heat generation and gas generation were observed. After the dropwise addition was completed, the flask was set in an oil bath, and the reaction was conducted for 7 hours while maintaining the internal temperature to be from 30 to 40° C. The reaction proceeded with the generation of gas, and a white solid was precipitated. After the reaction, the pressure inside the flask was reduced, and dichloromethane was distilled off. A yellowish white solid remained in the flask. The solid was analyzed by $^1$H-NMR, whereby it was confirmed that compound 2-1 was formed.

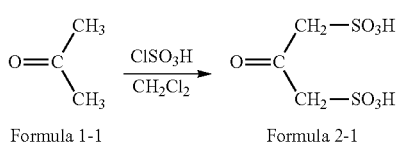

Formula 1-1       Formula 2-1

NMR spectrum of compound 2-1:
$^1$H-NMR (solvent: D$_2$O): 4.27 ppm (—CH$_2$—, 4H, s).
$^{13}$C-NMR (solvent: D$_2$O): 62.6 ppm (—CH$_2$—), 195.3 ppm (C═O).

Ex. 1-2

Compound 2-1 obtained in Ex. 1-1 was used directly in the next reaction without being isolated. Into the flask in Ex. 1, 2,049 g of thionyl chloride was added. The flask was heated to 80° C. and refluxed for 15 hours. As the reaction progressed, the reflux temperature increased from 52° C. to 72° C. Gas generation was confirmed during the reaction. The point at which compound 2-1 was all dissolved, and gas generation was subsided, was taken as the reaction end point. The reaction solution was transferred to a 2 L separable flask, and left to cool for 9 hours while the gas phase was sealed with nitrogen gas, whereby a dark brown solid was precipitated in the separable flask. By decantation, unreacted thionyl chloride was removed. Toluene was added to wash the precipitated solid, and again by decantation, the toluene was removed. Toluene washing was carried out a total of 3 times, and the total amount of toluene used was 1,207 g. The precipitated solid was dried at 25° C. for 71 hours under a nitrogen gas stream. The solid after the drying was collected and was analyzed by $^1$H-NMR, whereby it was confirmed that 356.5 g of compound 3-1 with a purity of 96.2% was obtained. The yield based on compound 1-1 became to be 56.0%.

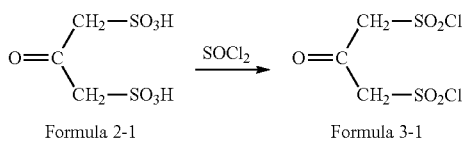

Formula 2-1       Formula 3-1

NMR spectrum of compound 3-1:
$^1$H-NMR: 5.20 ppm (—CH$_2$—, 4H, s).
$^{13}$C-NMR: 72.3 ppm (—CH$_2$—), 184.6 ppm (C═O).

Ex. 1-3

Into a 1 L four-necked flask equipped with a stirrer, a condenser and a thermometer, 90.0 g of compound 3-1 and 750 mL of acetonitrile were charged under nitrogen gas sealing. The flask was cooled in an ice bath, and 110.3 g of potassium hydrogen fluoride was added with stirring. The heat generation associated with the addition was slight. The ice bath was changed to a water bath, and the reaction was carried out for 62 hours while maintaining the internal temperature to be from 15 to 25° C. Along with the reaction, a fine white solid was produced. The reaction solution was transferred to a pressure filter, and unreacted potassium hydrogen fluoride and the product were separated by filtration. Acetonitrile was added to the filter, and the separated solid was washed until the filtrate became transparent, whereupon the washing solution was recovered. The filtrate and washing solution were subjected to an evaporator to distill off acetonitrile. 950 mL of toluene was added to the solid remaining after the drying, and the mixture was heated to 100° C. to dissolve the solid in toluene. The dissolved solution was filtered by gravity filtration to remove undissolved components. The filtrate was transferred to a 1 L separable flask, and left to cool for 14 hours while the gas phase was sealed with nitrogen gas, whereby pale brown acicular crystals were precipitated in the separable flask. The crystals were washed with toluene and dried at 25° C. for 30 hours under a nitrogen gas stream. The solid after the drying was recovered and analyzed by $^1$H-NMR and $^{19}$F-NMR, whereby it was confirmed that 58.1 g of compound 4-1 with a purity of 97.6% was obtained. The yield based on compound 3-1 became to be 72.3%.

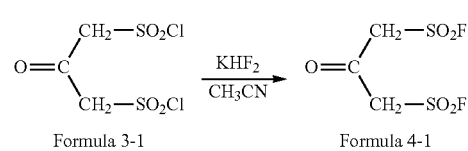

Formula 3-1       Formula 4-1

NMR spectrum of compound 4-1:
$^1$H-NMR: 4.97 ppm (—CH$_2$—, 4H, d, J=3.1 Hz).
$^{19}$F-NMR: 62.4 ppm (—SO$_2$F, 2F, t, J=3.1 Hz).
$^{13}$C-NMR: 60.7 ppm (—CH$_2$—), 184.9 ppm (C═O).

Ex. 1-4

Into a 200 mL nickel autoclave, 9.93 g of compound 4-1 and 89.7 g of acetonitrile were charged. The autoclave was cooled, and while maintaining the internal temperature to be from 0 to 5° C., nitrogen gas was fed at a flow rate of 6.7 L/hr, whereupon the reaction solution was bubbled for 1 hour. While maintaining the temperature of the reaction solution to be from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. From the autoclave, 103.2 g of the reaction solution was recovered. The reaction solution was quantitatively analyzed by 19F-NMR, whereby it was confirmed that compound 5-1 was contained at 8.4 mass %. The reaction yield based on compound 4-1 became to be 66%.

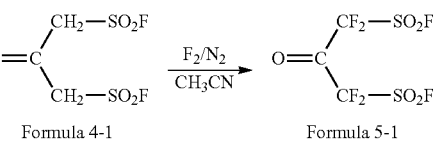

Formula 4-1       Formula 5-1

NMR spectrum of compound 5-1:
$^{19}$F-NMR: −104.1 ppm (—CF$_2$—, 4F, s), 45.8 ppm (—SO$_2$F, 2F, s).

Ex. 1-5

Into a 200 mL nickel autoclave, 19.9 g of compound 4-1 and 85.6 g of acetonitrile were charged. The autoclave was cooled, and while maintaining the internal temperature to be from 0 to 5° C., nitrogen gas was fed at a flow rate of 6.7 L/hr, whereupon the reaction solution was bubbled for 1 hour. While maintaining the temperature of the reaction solution to be from 0 to 5° C., a mixed gas of fluorine gas and nitrogen gas (mixing ratio=10.3 mol %/89.7 mol %) was introduced at a flow rate of 16.4 L/hr over 6.5 hours. Nitrogen gas was again fed at a flow rate of 6.7 L/hr, and the reaction solution was bubbled for 1 hour. From the autoclave, 109.6 g of the reaction solution containing compound 5-1 was recovered.

Ex. 1-6

Into a 200 mL nickel autoclave, 20.1 g of compound 4-1 and 80.1 g of acetonitrile were charged. The autoclave was cooled, and while maintaining the internal temperature to be from 0 to 5° C., nitrogen gas was fed at a flow rate of 6.7 L/hr, whereupon the reaction solution was bubbled for 1 hour. While maintaining the temperature of the reaction solution to be from 0 to 5° C., a mixed gas of fluorine gas and nitrogen gas (mixing ratio=20.0 mol %/80.0 mol %) was introduced at a flow rate of 8.4 L/hr over 6 hours. Nitrogen gas was again fed at a flow rate of 6.7 L/hr, and the reaction solution was bubbled for 1 hour. From the autoclave, 107.1 g of the reaction solution containing compound 5-1 was recovered.

Ex. 1-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath, and while maintaining the internal temperature to be from 0 to 10° C. with stirring, 8.43 g of the reaction solution obtained in Ex. 1 to 4 was dropwise added by using a plastic syringe. Strong heat generation was confirmed, and it took 15 minutes for the dropwise addition. After the dropwise addition was completed, the ice bath was replaced with a water bath, and the reaction was carried out at from 15 to 20° C. for 1 hour. The flask was again cooled in an ice bath, and while maintaining the temperature of the reaction solution to be from 0 to 10° C., from the dropping funnel, 6.56 g of compound 6-1 was dropwise added. After the dropwise addition was completed, the ice bath was replaced with a water bath and the reaction was carried out at from 20 to 25° C. for 3.5 hours. A by-product solid was removed from the reaction solution by suction filtration, and the filtrate was recovered. The filtered residual solid was washed with a suitable amount of acetonitrile, and the washing liquid was mixed with the filtrate. 37.1 g of the filtrate was quantitatively analyzed by $^{19}$F-NMR, whereby it was confirmed that compound 7-1 was contained in an amount of 2.04 mass %. The reaction yield based on compound 4-1 became to be 46.6%.

NMR spectrum of compound 7-1:
$^{19}$F-NMR: −191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$—SO$_2$F, 4F, m), −101.5 ppm (CF$_2$=CF—, 1F, ddt, J=116, 49, 27 Hz), −87.6 ppm (CF$_2$=CF—, 1F, ddt, J=49, 38, 7 Hz), −67.5 ppm (—CF$_2$—O—, 2F, m), 46.8 ppm (—SO$_2$F, 2F, s).

Ex. 1-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath, and while maintaining the internal temperature to be from 0 to 10° C. with stirring, 79.8 g of the reaction solution obtained in Ex. 1-5 was dropwise added by using a plastic dropping funnel. Strong heat generation was confirmed, and it took 23 minutes for the dropwise addition. After the dropwise addition was completed, the ice bath was replaced with a water bath, and the reaction was carried out at from 20 to 30° C. for 5.5 hours. The flask was again cooled in an ice bath, and while maintaining the temperature of the reaction solution to be from 0 to 10° C., 146.0 g of compound 6-1 was dropwise added from the dropping funnel. After the dropwise addition was completed, the ice bath was replaced with a water bath, and the reaction was carried out at from 15 to 25° C. for 16 hours. In the same manner as in Ex. 1-7, suction filtration was conducted, and 412.3 g of the obtained filtrate was quantitatively analyzed by $^{19}$F-NMR, whereby it was confirmed that compound 7-1 was contained in an amount of 3.93 mass %. The reaction yield based on compound 4-1 became to be 55.9%. By vacuum distillation of the filtrate, compound 7-1 was isolated as a fraction with a boiling point of 97.2° C./10 kPa. The gas chromatographic purity was 98.0%.

Ex. 1-9

Into a 50 mL four-necked flask equipped with a stirrer, a condenser, a thermometer and a dropping funnel, 3.70 g of potassium fluoride and 10.9 g of acetonitrile were charged. The flask was cooled in an ice bath, and while maintaining the internal temperature to be from 0 to 10° C. with stirring, 10.2 g of the reaction solution obtained in Ex. 1-6 was dropwise added by using a plastic syringe. Strong heat generation was confirmed, and it took 8 minutes for the dropwise addition. After the dropwise addition was completed, the ice bath was replaced with a water bath, and the reaction was carried out at from 20 to 30° C. for 3 hours. The flask was again cooled in an ice bath, and while maintaining the temperature of the reaction solution to be from 0 to 10° C., 14.6 g of compound 6-1 was dropwise added from the dropping funnel. After the dropwise addition was completed, the ice bath was replaced with a water bath, and the reaction was carried out at from 15 to 25° C. for 17 hours. In the same manner as in Ex. 1-7, suction filtration was conducted, and 55.9 g of the obtained filtrate was quantitatively analyzed by $^{19}$F-NMR, whereby it was confirmed that compound 7-1 was contained in an amount of 4.77 mass %. The reaction yield based on compound 4-1 became to be 69.6%. Further, the reaction yield based on compound 1-1 (reaction yield over the entire monomer synthesis step) became to be 28.2%.

Ex. 2

Ex. 2-1

Into an autoclave (internal volume: 100 mL, made of stainless steel), 70.0 g of compound 7-1 was put, cooled with

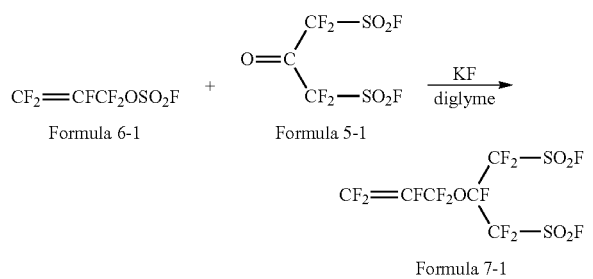

liquid nitrogen, and degassed. 2.53 g of TFE was introduced into the autoclave and heated in an oil bath until the internal temperature reached 100° C. The pressure at that time was 0.29 MPaG (gauge pressure). A mixed solution of 36.3 mg of PFtBPO as a polymerization initiator and 2.58 g of HFC-52-13p was injected into the autoclave. Further, nitrogen gas was introduced from the injection line, and the injection liquid in the injection line was completely pushed in. By this operation, TFE in the gas phase was diluted, and as a result, the pressure increased to 0.56 MPaG. While maintaining the pressure at 0.56 MPaG, polymerization was carried out by continuously adding TFE. When the amount of TFE added reached 4.03 g in 9.5 hours, the inside of the autoclave was cooled to stop the polymerization, and the gas in the system was purged. The reaction solution was diluted with HFC-52-13p, HFE-347pc-f was added, and the polymer was precipitated and filtered. Then, the operation of stirring the polymer in HFC-52-13p and reprecipitating it with HFE-347pc-f was repeated twice. Vacuum drying was conducted at 120° C. to obtain polymer F-1 being a copolymer of TFE and compound 7-1. Using the obtained polymer F-1, the above-mentioned various physical properties were measured. The results are shown in Table 1.

Ex. 2-2

The respective conditions in Ex. 2-1 were changed as shown in Table 1. However, in Ex. 2-2, the initial charging of TFE was not conducted, and, instead, after heating to the polymerization temperature, TFE was charged to the pressure before the nitrogen gas dilution shown in Table 1. Except for this, polymer F-2 was obtained in the same manner as in Ex. 2-1. Using the obtained polymer F-2, the above-mentioned various physical properties were measured. The results are shown in Table 1.

TABLE 1

|  | Ex. 2-1 | Ex. 2-2 |
| --- | --- | --- |
| Reactor volume [mL] | 100 | 100 |
| Compound 7-1 [g] | 70.0 | 80.0 |
| Initial charge of TFE [g] | 2.53 | — |
| HFC-52-13p [g] | 2.58 | 4.23 |
| Type of polymerization initiator | PFtBPO | PFtBPO |
| Amount of polymerization initiator [mg] | 36.3 | 41.4 |
| Polymerization temperature [° C.] | 100 | 100 |
| Pressure before nitrogen gas dilution [MPaG] | 0.29 | 0.29 |
| Polymerization pressure [MpaG] | 0.56 | 0.56 |
| Continuously added TFE [g] | 4.03 | 5.59 |
| Polymerization time [hr] | 9.5 | 6.9 |
| Type of polymer F | F-1 | F-2 |
| Yield of polymer F [g] | 6.4 | 8.47 |
| Compound 7-1 units [mol %] | 13.8 | 12.4 |
| TFE units [mol %] | 86.2 | 87.6 |
| Ion exchange capacity [meq/g dry resin] | 1.87 | 1.74 |
| TQ value [° C.] | 238 | 298 |
| Tg [° C.] | 39 | 41 |

Ex. 3

Ex. 3-1

Using polymer F-1, a membrane of polymer H-1 was obtained by the following method.

Polymer F-1 was press-molded at a temperature higher by 10° C. than the TQ value and 4 MPa (gauge pressure) to obtain a membrane of polymer F-1. The membrane of polymer F-1 was immersed in an alkaline aqueous solution A (potassium hydroxide/water=20/80 (mass ratio)) at 80° C. for 16 hours to hydrolyze —$SO_2F$ of polymer F-1 and convert it to —$SO_3K$. Further, the membrane of the polymer was immersed in a 3 mol/L hydrochloric acid aqueous solution at 50° C. for 30 minutes, and then immersed in ultrapure water at 80° C. for 30 minutes. The cycle of immersion in hydrochloric acid aqueous solution and immersion in ultrapure water, was carried out a total of 5 times to convert —$SO_3K$ of the polymer to —$SO_3H$. Washing with ultrapure water was repeated until the pH of the water in which the membrane of the polymer was immersed became 7. The membrane of the polymer was sandwiched between filter papers and air-dried to obtain a membrane of polymer H-1.

Ex. 3-2

A membrane of polymer H-2 was obtained in the same manner as in Ex. 3-1 except that instead of polymer F-1, polymer F-2 was used, and instead of the alkaline aqueous solution A, an alkaline aqueous solution C (potassium hydroxide/methanol/water=15/20/65 (mass ratio)) was used.

Ex. 4

Ex. 4-1

Into a Hastelloy autoclave having an internal volume of 230 mL, 123.8 g of PSVE, 35.2 g of HCFC-225cb and 63.6 mg of AIBN were put, cooled with liquid nitrogen, and degassed. The temperature was raised to 70° C., TFE was introduced into the system, and the pressure was maintained at 1.14 MPa (gauge pressure). TFE was continuously added so that the pressure became constant at 1.14 MPa (gauge pressure). After 7.9 hours, when the amount of TFE added reached 12.4 g, the autoclave was cooled, and the gas in the system was purged to terminate the reaction. The polymer solution was diluted with HCFC-225cb, then HCFC-141b was added for precipitation. After washing with HCFC-225cb and HCFC-141b, the mixture was dried to obtain 25.1 g of polymer F'-1 being a copolymer of TFE and PSVE. The results are shown in Table 2.

TABLE 2

|  | Ex. 4-1 |
| --- | --- |
| Reactor volume [mL] | 230 |
| Type of monomer having a —$SO_2F$ group | PSVE |
| Content of monomer having a —$SO_2F$ group | 123.8 |
| HCFC-225cb [g] | 35.2 |
| Type of polymerization initiator | AIBN |
| Amount of polymerization initiator [mg] | 63.6 |
| Polymerization temperature [° C.] | 70 |
| Polymerization pressure [MPaG] | 1.14 |
| Polymerization time [hr] | 7.9 |
| Type of polymer F' | F'-1 |
| Yield of polymer F' [g] | 25.1 |
| Monomer units having a —$SO_2F$ group [mol %] | 17.7 |
| TFE units [mol %] | 82.3 |
| Ion exchange capacity [meq/g dry resin] | 1.10 |
| TQ value [° C.] | 225 |
| Tg [° C.] | 8 |

Ex. 5

Ex. 5-1

A membrane of polymer H'-1 was obtained in the same manner as in Ex. 3-1 except that polymer F'-1 was used instead of polymer F-1.

Ex. 6

Ex. 6-1

Into a 100 mL container made of polytetrafluoroethylene (PTFE), 4.3 g of a finely cut polymer H-1 membrane and 75 g of ultrapure water were added, and heated at 200° C. for 24 hours. The content was transferred to a PTFE container and air-dried at 30° C. for 64 hours in a nitrogen atmosphere. The dried polymer H-1 was transferred to a 200 mL glass autoclave, and 21.4 g of a mixed solvent of ultrapure water/ethanol (50/50 (mass ratio)) was added. After stirring at 110° C. for 25 hours, 3.87 g of ultrapure water was added for dilution. After stirring at 90° C. for 5 hours, the mixture was left to cool and filtered by means of a pressure filter (filter paper: manufactured by Advantec Toyo Kaisha, Ltd., PF040), to obtain 31.9 g of a liquid composition S-1 having polymer H-1 dispersed in the mixed solvent.

The liquid composition S-1 was applied on a 100 μm ethylene-tetrafluoroethylene copolymer (ETFE) sheet by a die coater to form a membrane, which was dried at 80° C. for 15 minutes, and further dried at 185° C. for 30 minutes to obtain a polymer electrolyte membrane 1 made of a membrane of polymer H being an electrolyte. The amount of the liquid composition applied was adjusted so that the membrane thickness of the polymer electrolyte membrane became to have the value as shown in Tables 3-1 to 3-2. The results are shown in Table 3-1.

Ex. 6-2 to 6-16

In the same manner as in Ex. 6-1 except that a liquid composition is prepared by using polymer H or polymer H' as shown in Tables 3-1 to 3-2 instead of the polymer H-1, and the coating amount of the liquid composition was adjusted so that the membrane thickness of the polymer electrolyte membrane became to have the value as shown in Tables 3-1 to 3-2, polymer electrolyte membranes 2 to 16 made of a membrane of polymer H or H', were obtained. The results are shown in Tables 3-1 to 3-2.

TABLE 3-1

|  | Ex. 6-1 | Ex. 6-2 | Ex. 6-3 | Ex. 6-4 | Ex. 6-5 | Ex. 6-6 | Ex. 6-7 | Ex. 6-8 |
|---|---|---|---|---|---|---|---|---|
| Type of polymer | H-1 | H-1 | H-1 | H-1 | H-2 | H-2 | H-2 | H-2 |
| Ion exchange capacity of polymer H or polymer H' [meq/g dry resin] | 1.87 | 1.87 | 1.87 | 1.87 | 1.74 | 1.74 | 1.74 | 1.74 |
| Hydrogen gas permeation coefficient of membrane made of polymer H or polymer H' [$cm^3 \cdot cm/(s \cdot cm^2 \cdot cmHg)$] | 2.10E−09 | 2.10E−09 | 2.10E−09 | 2.10E−09 | 1.60E−09 | 1.60E−09 | 1.60E−09 | 1.60E−09 |
| Type of polymer electrolyte membrane | 1 | 2 | 3 | 4 | 5 | 6 | 7 | 8 |
| Membrane thickness of polymer electrolyte membrane [μm] | 7 | 10 | 15 | 20 | 7 | 10 | 15 | 20 |

TABLE 3-2

|  | Ex. 6-9 | Ex. 6-10 | Ex. 6-11 | Ex. 6-12 | Ex. 6-13 | Ex. 6-14 | Ex. 6-15 | Ex. 6-16 |
|---|---|---|---|---|---|---|---|---|
| Type of polymer | H-1 | H-1 | H-2 | H-2 | H'-1 | H'-1 | H'-1 | H'-1 |
| Ion exchange capacity of polymer H or polymer H' [meq/g dry resin] | 1.87 | 1.87 | 1.74 | 1.74 | 1.10 | 1.10 | 1.10 | 1.10 |
| Hydrogen gas permeation coefficient of membrane made of polymer H or polymer H' [$cm^3 \cdot cm/(s \cdot cm^2 \cdot cmHg)$] | 2.10E−09 | 2.10E−09 | 1.60E−09 | 1.60E−09 | 5.50E−09 | 5.50E−09 | 5.50E−09 | 5.50E−09 |
| Type of polymer electrolyte membrane | 9 | 10 | 11 | 12 | 13 | 14 | 15 | 16 |
| Membrane thickness of polymer electrolyte membrane [μm] | 5 | 25 | 5 | 25 | 25 | 20 | 10 | 7 |

In Tables 3-1 to 3-2, the description such as "2.10E-09" is an abbreviation for exponential notation. As a specific example, "2.10E-09" means "2.10×10$^{-9}$". The same applies to Tables 4-1 to 4-2 given later.

Ex. 7

Ex. 7-1

Polymer H'-1 and a mixed solvent of ethanol/water (60/40 (mass ratio)) were mixed to obtain a polymer H'-1 dispersion having a solid content concentration of 25.8 mass %.

To 44 g of a supported catalyst (manufactured by Tanaka Kikinzoku Kogyo) in which 46 mass % of platinum was supported on carbon powder, 221.76 g of water and 174.24 g of ethanol were added, and the mixture was mixed and pulverized by using an ultrasonic homogenizer to obtain a dispersion of the catalyst. To the dispersion of the catalyst, 102.06 g of a mixed solution having 80.16 g of the polymer H'-1 dispersion, 44.4 g of ethanol and 25.32 g of ZEORORA-H (manufactured by Zeon Corporation) preliminarily mixed and kneaded, was added, and further, 26.77 g of water and 12 g of ethanol were added, followed by mixing by using an ultrasonic homogenizer to adjust the solid content concentration to 10 mass %, then a coating liquid for forming a catalyst layer was obtained. The liquid was applied onto an ETFE sheet by a die coater, and dried at 80° C., and further heat-treated at 160° C. for 30 minutes to form a catalyst layer having a platinum content of 0.4 mg/cm$^2$.

81.6 g of ethanol and 154.4 g of distilled water were added to 50 g of vapor-grown carbon fiber (manufactured by Showa Denko K.K., trade name: VGCF-H, fiber diameter of about 150 nm, fiber length of 10 to 20 μm) and stirred well. To this, 89 g of a polymer H'-1 dispersion prepared by mixing polymer H'-1 and a mixed solvent of ethanol/water (60/40 (mass ratio)) at a solid content concentration of 28.1%, was added and stirred well, and further, the mixture was mixed and pulverized by using an ultrasonic homogenizer to prepare a coating liquid for forming an intermediate layer.

The coating liquid for forming an intermediate layer was applied to the surface of a gas diffusion base material (manufactured by NOK, trade name: X0086 T10X13) by using a die coater, so that the solid content became to be 3 mg/cm$^2$, and dried at 80° C., then a gas diffusion base material provided with an intermediate layer, in which an intermediate layer was formed on the surface of the carbon non-woven fabric was obtained.

The polymer electrolyte membrane 1 was sandwiched by two ETFE sheets provided with the catalyst layers from both sides, and hot-pressed under the conditions of a press temperature of 160° C., a press time of 2 minutes, and a pressure of 3 MPa, to bond the catalyst layers to both sides of the polymer electrolyte membrane 1, then the ETFE films were peeled off from the catalyst layers to obtain a membrane catalyst layer assembly having an electrode area of 25 cm$^2$.

A gas diffusion base material provided with a carbon layer (manufactured by NOK, trade name: X0086 IX92 CX320) was disposed on the anode side, and a gas diffusion base material provided with an intermediate layer was disposed on the cathode side, respectively, so that the carbon layer and the intermediate layer were to be in contact with the catalyst layer side. A membrane electrode assembly to be used for initial power generation characteristic evaluation and hydrogen leak amount evaluation was prepared by heating and pressing at a press temperature of 160° C., a press time of 2 minutes, and a pressure of 3 MPa. The results are shown in Table 4-1.

Ex. 7-2 to 7-8, Ex. 7-11 to 7-18

In the same manner as in Ex. 7-1 except that the polymer electrolyte membranes 2 to 16 shown in Tables 3-1 to 3-2 were used instead of the polymer electrolyte membrane 1 obtained in Ex. 6-1, a membrane electrode assembly to be used for initial power generation characteristic evaluation and hydrogen leakage amount evaluation was prepared. The results are shown in Tables 4-1 to 4-2.

Ex. 7-9

In the same manner as in Ex. 7-1 except that the polymer electrolyte membrane 8 shown in Table 3-1 was used instead of the polymer electrolyte membrane 1 obtained in Ex. 6-1, the following polymer H'-2 dispersion was used for the polymer H'-1 dispersion to be used for preparing the coating liquid for forming the catalyst layer, and the addition amounts were adjusted so that the mass ratio of the polymer and the catalyst carrier in the coating liquid for forming the catalyst layer did not change, a membrane electrode assembly to be used for initial power generation characteristic evaluation and hydrogen leak amount evaluation was prepared. The results are shown in Table 4-1.

The polymer H'-2 dispersion was prepared as follows.

Into a stainless steel autoclave having an internal volume of 230 mL, 459.97 g of the monomer represented by the formula m32-1 and 79.28 g of the monomer represented by the formula m22-1 were charged, and sufficiently degassed under cooling with liquid nitrogen. 22.38 g of TFE was charged, 161.5 mg of a radical polymerization initiator $((C_3F_7COO)_2)$ heated to 22° C. and dissolved in a solvent (manufactured by AGC Inc., trade name: AC-2000) at a concentration of 2.91 mass %, was charged, and the charging line was washed with 2 g of AC-2000, to initiate the reaction. After stirring for 24 hours, the autoclave was cooled to stop the reaction.

After diluting the product with AC-2000, the diluted product was mixed with a mixture of AC-2000: methanol=8:2 (mass ratio) to precipitate the polymer, which was filtered. The polymer was washed in a mixed solution of AC-2000:methanol=7:3 (mass ratio), separated by filtration, and then, the solid content was dried under reduced pressure at 80° C. overnight to obtain polymer (F'-2).

By immersing the obtained polymer (F'-2) in an aqueous solution at 50° C. containing 20 mass % of methanol and 15 mass % of potassium hydroxide for 40 hours, to hydrolyze —SO$_2$F groups in polymer (F'-2) and convert them to —SO$_3$K groups. The polymer was then immersed in a 3 mol/L hydrochloric acid aqueous solution at room temperature for 2 hours. The aqueous hydrochloric acid solution was exchanged, and the same treatment was repeated four more times to obtain polymer H'-2 in which the —SO$_3$K groups in the polymer were converted to sulfonic acid groups.

The composition of the structural units constituting polymer H'-2 was analyzed by $^{19}$F-NMR, whereby in the polymer H'-2, the content of the monomer units represented by the formula m22-1 was 50 mol %, the content of the monomer units represented by the formula m32-1 was 21.3 mol %, and the content of TFE units was 28.7 mol %, to all units contained in the polymer H'-2.

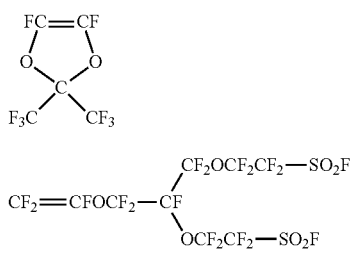

$$\text{(m22-1)}$$

$$CF_2=CFOCF_2-CF\begin{smallmatrix}CF_2OCF_2CF_2-SO_2F\\\\OCF_2CF_2-SO_2F\end{smallmatrix} \quad \text{(m32-1)}$$

The obtained polymer H'-2 and a mixed solvent of ethanol/water (60/40 (mass ratio)) were mixed to obtain a polymer H'-2 dispersion having a solid content concentration of 10 mass %.

Ex. 7-10

In the same manner as in Ex. 7-9, except that instead of the polymer H'-2 dispersion used for preparing the catalyst layer forming coating liquid, the following polymer H'-3 dispersion was used, and the addition amounts were adjusted so that the mass ratio of the polymer and the catalyst carrier in the coating liquid for forming the catalyst layer did not change, a membrane electrode assembly to be used for initial power generation characteristic evaluation and hydrogen leakage amount evaluation was prepared. The results are shown in Table 4-1.

Polymer H'-3 was obtained in the same manner as in the method for synthesizing polymer H'-2, except that the amounts of the respective monomers used in the synthesis of polymer H'-2 were adjusted.

The composition of the structural units constituting polymer H'-3 was analyzed by $^{19}$F-NMR, whereby in polymer H'-3, the content of the monomer units represented by the formula m22-1 was 65 mol %, the content of the monomer units represented by the formula m32-1 was 17 mol %, and the content of the TFE units was 18 mol %, to all units contained in polymer H'-3.

A polymer H'-3 dispersion was obtained in the same manner as in the preparation of the polymer H'-2 dispersion, except that polymer H'-3 was used instead of polymer H'-2.

TABLE 4-1

|  | Ex. 7-1 | Ex. 7-2 | Ex. 7-3 | Ex. 7-4 | Ex. 7-5 | Ex. 7-6 | Ex. 7-7 | Ex. 7-8 | Ex. 7-9 | Ex. 7-10 |
|---|---|---|---|---|---|---|---|---|---|---|
| Type of polymer electrolyte membrane | 1 | 2 | 3 | 4 | 5 | 6 | 7 | 8 | 8 | 8 |
| Type of polymer contained in the catalyst layer of the cathode | H'-1 | H'-1 | H'-1 | H'-1 | H'-1 | H'-1 | H'-1 | H'-1 | H'-2 | H'-3 |
| Ion exchange capacity of polymer contained in the catalyst layer of the cathode [meq/g dry resin] | 1.10 | 1.10 | 1.10 | 1.10 | 1.10 | 1.10 | 1.10 | 1.10 | 1.50 | 1.20 |
| Hydrogen gas permeation coefficient of membrane made of polymer contained in the catalyst layer of the cathode [$cm^3 \cdot cm/(s \cdot cm^2 \cdot cmHg)$] | 5.50E−09 | 5.50E−09 | 5.50E−09 | 5.50E−09 | 5.50E−09 | 5.50E−09 | 5.50E−09 | 5.50E−09 | 1.20E−08 | 1.95E−08 |
| Difference in hydrogen gas permeation coefficient [$cm^3 \cdot cm/(s \cdot cm^2 \cdot cmHg)$] | 3.40E−09 | 3.40E−09 | 3.40E−09 | 3.40E−09 | 3.90E−09 | 3.90E−09 | 3.90E−09 | 3.90E−09 | 1.04E−08 | 1.79E−08 |
| Initial power generation characteristics | ○ | ○ | ○ | ○ | ○ | ○ | ○ | ○ | ◎ | ◎◎ |
| Hydrogen leak amount | ○ | ○ | ◎ | ◎ | ○ | ○ | ◎ | ◎ | ◎ | ◎ |

TABLE 4-2

|  | Ex. 7-11 | Ex. 7-12 | Ex. 7-13 | Ex. 7-14 | Ex. 7-15 | Ex. 7-16 | Ex. 7-17 | Ex. 7-18 |
|---|---|---|---|---|---|---|---|---|
| Type of polymer electrolyte membrane | 9 | 10 | 11 | 12 | 13 | 14 | 15 | 16 |
| Type of polymer contained in the catalyst layer of the cathode | H'-1 | H'-1 | H'-1 | H'-1 | H'-1 | H'-1 | H'-1 | H'-1 |
| Ion exchange capacity of polymer contained in the catalyst layer of the cathode [meq/g dry resin] | 1.10 | 1.10 | 1.10 | 1.10 | 1.10 | 1.10 | 1.10 | 1.10 |
| Hydrogen gas permeation coefficient of membrane made of polymer contained in the catalyst layer of the cathode [$cm^3 \cdot cm/(s \cdot cm^2 \cdot cmHg)$] | 5.50E−09 | 5.50E−09 | 5.50E−09 | 5.50E−09 | 5.50E−09 | 5.50E−09 | 5.50E−09 | 5.50E−09 |
| Difference in hydrogen gas permeation coefficient [$cm^3 \cdot cm/(s \cdot cm^2 \cdot cmHg)$] | 3.40E−09 | 3.40E−09 | 3.90E−09 | 3.90E−09 | 0 | 0 | 0 | 0 |

TABLE 4-2-continued

|  | Ex. 7-11 | Ex. 7-12 | Ex. 7-13 | Ex. 7-14 | Ex. 7-15 | Ex. 7-16 | Ex. 7-17 | Ex. 7-18 |
| --- | --- | --- | --- | --- | --- | --- | --- | --- |
| Initial power generation characteristics | ○ | X | ○ | X | X | X | X | ○ |
| Hydrogen leak amount | X | ⊚ | X | ⊚ | ○ | ○ | X | X |

In Tables 4-1 to 4-2, the difference in hydrogen gas permeation coefficient means the value (Hc−Hk) obtained by subtracting the hydrogen gas permeation coefficient (hereinafter referred to also as "Hk") of the above-mentioned polymer electrolyte contained in the electrolyte membrane from the hydrogen gas permeation coefficient (hereinafter referred to also as "Hc") of the polymer having ion exchange groups in the catalyst layer of the cathode.

As shown in Tables 3-1 to 3-2 and Tables 4-1 to 4-2, when a polymer electrolyte membrane containing a polymer electrolyte, of which the hydrogen gas permeation coefficient under the conditions of a temperature of 80° C. and a relative humidity of 10% was at most $2.4 \times 10^{-9}$ cm$^3$·cm/(s·cm$^2$·cmHg) and having a membrane thickness of from 7 to 20 μm, was used, a polymer electrolyte fuel cell excellent in power generation characteristics and hydrogen gas utilization efficiency, was obtained (Ex. 6-1 to 6-8 and Ex. 7-1 to 7-10).

On the other hand, when a polymer electrolyte membrane in which at least one of the hydrogen gas permeation coefficient and the membrane thickness was out of the above range, was used, at least one of the power generation characteristics and the hydrogen gas utilization efficiency of the polymer electrolyte fuel cell obtained by using this, was inferior (Ex. 6-9 to 6-16, 7-11 to 7-18).

This application is a continuation of PCT Application No. PCT/JP2020/008344, filed on Feb. 28, 2020, which is based upon and claims the benefit of priority from Japanese Patent Application No. 2019-036477 filed on Feb. 28, 2019. The contents of those applications are incorporated herein by reference in their entireties.

REFERENCE SYMBOLS

10: Membrane electrode assembly
11: Catalyst layer
12: Gas diffusion layer
13: Anode
14: Cathode
15: Electrolyte membrane

What is claimed is:

1. A polymer electrolyte membrane comprising a polymer electrolyte, wherein said membrane has a hydrogen gas permeation coefficient under conditions of a temperature of 80° C. and a relative humidity of 10% of at most $2.4 \times 10^{-9}$ cm$^3$·cm/(s·cm$^2$·cmHg), and a thickness of 7 to 20 μm.

2. The polymer electrolyte membrane according to claim 1, wherein the polymer electrolyte is a perfluoropolymer having acid-type sulfonic acid groups.

3. The polymer electrolyte membrane according to claim 2, wherein the perfluoropolymer comprises perfluoromonomer units, and the perfluoromonomer units comprise at least one type of units selected from the group consisting of perfluorovinyl ether units and perfluoroallyl ether units.

4. The polymer electrolyte membrane according to claim 2, wherein the content of at least one type of units selected from the group consisting of units having a halogen atom other than a fluorine atom, units having a ring structure, and units having a crosslinked structure consisting of a covalent bond is at most 1 mol % relative to all units in the perfluoropolymer.

5. The polymer electrolyte membrane according to claim 3, wherein the perfluoropolymer comprises perfluoroallyl ether units represented by formula A-1:

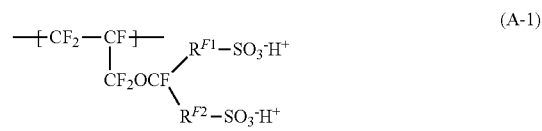

where, in the formula A-1, $R^{F1}$ and $R^{F2}$ are each independently a $C_{1-3}$ perfluoroalkylene group.

6. The polymer electrolyte membrane according to claim 3, wherein the perfluoromonomer units further comprise tetrafluoroethylene units.

7. The polymer electrolyte membrane according to claim 1, wherein the ion exchange capacity of the polymer electrolyte is from 1.4 to 2.5 meq/g dry resin.

8. A membrane electrode assembly comprising an anode having a catalyst layer, a cathode having a catalyst layer, and the polymer electrolyte membrane as defined in claim 1, disposed between the anode and the cathode.

9. The membrane electrode assembly according to claim 8, wherein the catalyst layer of the cathode comprises a catalyst and a polymer having ion exchange groups, and the value obtained by subtracting the hydrogen gas permeation coefficient of the polymer electrolyte from the hydrogen gas permeation coefficient of the polymer having ion exchange groups, is at least $1.0 \times 10^{-8}$ cm$^3$·cm/(s·cm$^2$·cmHg).

10. A polymer electrolyte fuel cell comprising the membrane electrode assembly as defined in claim 8.

11. The polymer electrolyte membrane according to claim 1, wherein:
the polymer electrolyte is a perfluoropolymer comprising tetrafluoroethylene units and 7-45 mol %, based on all units in said perfluoropolymer, of at least one type of units selected from the group consisting of perfluorovinyl ether units comprising at least two acid-type sulfonic acid groups and perfluoroallyl ether units comprising at least two acid-type sulfonic acid groups;
a content of units in the perfluoropolymer having a halogen atom other than a fluorine atom is at most 1 mol % relative to all units;
a content of units in the perfluoropolymer having a ring structure is at most 1 mol % relative to all units; and
a content of units in the perfluoropolymer having a crosslinked structure consisting of a covalent bond is at most 1 mol % relative to all units.

12. The polymer electrolyte membrane according to claim 11, wherein the perfluoropolymer comprises said perfluoroallyl ether units comprising at least two acid-type sulfonic acid groups.

13. The polymer electrolyte membrane according to claim 11, wherein the perfluoropolymer comprises perfluoroallyl ether units represented by formula A-1:

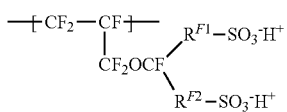
(A-1)

where, in the formula A-1, $R^{F1}$ and $R^{F2}$ are each independently a $C_{1-3}$ perfluoroalkylene group.

14. The polymer electrolyte membrane according to claim 12, wherein the perfluoropolymer comprises 8-22 mol %, based on all units in said perfluoropolymer, of said perfluoroallyl ether units comprising at least two acid-type sulfonic acid groups.

15. The polymer electrolyte membrane according to claim 13, wherein $R^{F1}$ and $R^{F2}$ are each a $C_1$ perfluoroalkylene group.

16. The polymer electrolyte membrane according to claim 15, wherein the perfluoropolymer comprises 8-22 mol %, based on all units in said perfluoropolymer, of said perfluoroallyl ether units represented by formula A-1.

17. A membrane electrode assembly comprising an anode having a catalyst layer, a cathode having a catalyst layer, and the polymer electrolyte membrane as defined in claim 11, disposed between the anode and the cathode.

18. The membrane electrode assembly according to claim 17, wherein the catalyst layer of the cathode comprises a catalyst and a polymer having ion exchange groups, and the value obtained by subtracting the hydrogen gas permeation coefficient of the polymer electrolyte from the hydrogen gas permeation coefficient of the polymer having ion exchange groups, is at least $1.0 \times 10^{-8}$ cm$^3$·cm/(s·cm$^2$·cmHg).

19. A polymer electrolyte fuel cell comprising the membrane electrode assembly as defined in claim 17.

20. A membrane electrode assembly comprising an anode having a catalyst layer, a cathode having a catalyst layer, and the polymer electrolyte membrane as defined in claim 16, disposed between the anode and the cathode.

* * * * *